Sept. 5, 1950      E. I. SHOBERT, II      2,521,610

COMPOSITE BRUSH AND METHOD OF MAKING IT

Filed May 8, 1948

Inventor
Erle J. Shobert II

By Brown, Critchlow, Flick & Peckham
His Attorneys

Patented Sept. 5, 1950

2,521,610

UNITED STATES PATENT OFFICE 2,521,610

COMPOSITE BRUSH AND METHOD OF MAKING IT

Erle I. Shobert, II, St. Marys, Pa., assignor to Stackpole Carbon Company, St. Marys, Pa., a corporation of Pennsylvania Application May 8, 1948, Serial No. 25,964

4 Claims. (Cl. 171—325)

1

This invention relates to composite electric brushes used in dynamoelectric machines, and more particularly to a method of fastening the different parts of such a brush together.

Composite brushes are made from layers of carbon on opposite sides of an intermediate layer formed from a better electrical conductor. Although many attempts have been made to make these composite or sandwich brushes by molding the different compositions together, the brushes have not been very satisfactory.

It is among the objects of this invention to provide a method of making composite brushes in which carbon layers can be securely connected to a metal block or plate between them in an inexpensive manner that gives a good electrical connection. Another object is to provide a composite electric brush in which the layers are connected by mechanically and electrically satisfactory joints.

In accordance with this invention, titanium hydride is applied to one side of each of a pair of carbon layers or blocks. A thin metal plate or block then is placed between the coated sides and soldered to them. A shunt wire then is connected to one end of the three blocks. The solder has a high melting point, such as pure silver or copper or a silver or copper alloy. The soldering is done by placing the assembled members in a furnace having a pure atmosphere, such as hydrogen, the moisture content of which is held to a minimum. The temperature of the furnace is high enough to melt the solder so that it will flow and join the carbon and metal, but not so high as to melt the metal block. The titanium hydride causes the solder to make such a strong bond with the carbon blocks that if any breaking occurs at the connection, the break will take place in the bodies of the carbon blocks rather than in the joint between them and the metal block. The shunt wire can be clamped to one of the carbon blocks by a rivet extending through the metal block. If desired, a thin layer of solder can first be joined only to the titanium hydride covered sides of the carbon blocks, and then the metal sides thus formed be subsequently joined outside the furnace to the metal block between them by welding or brazing.

Figure 1:
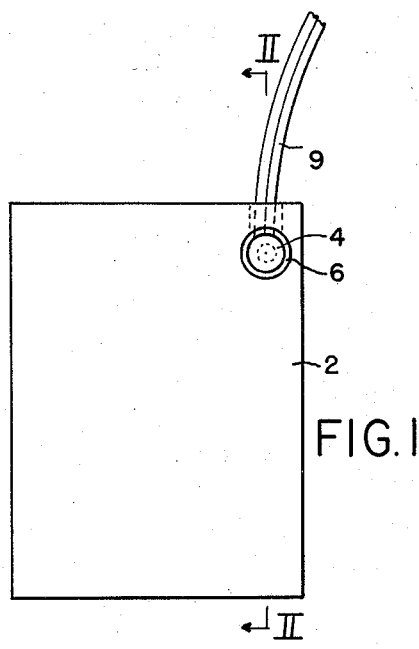
Figure 2:
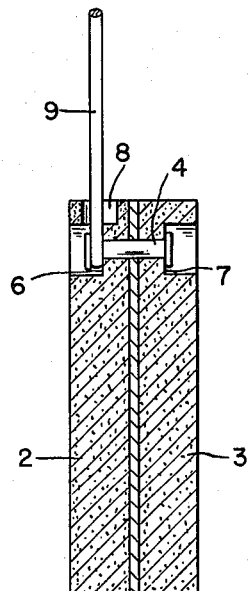
Figure 3:
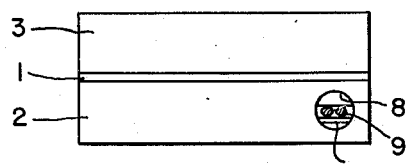
Figure 4:
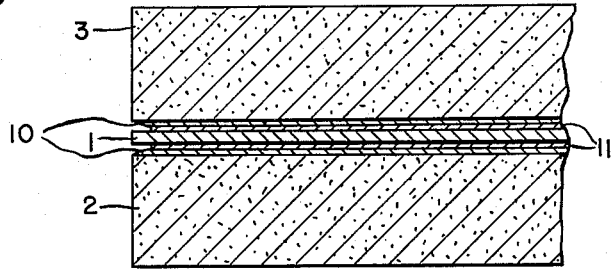
Figure 5:
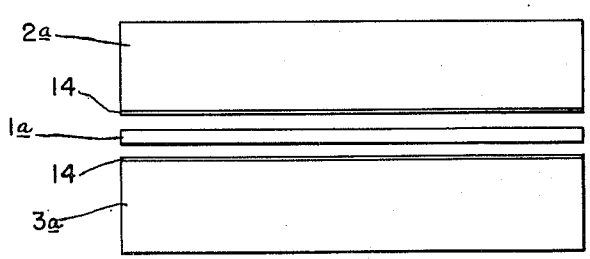

The invention is illustrated in the accompanying drawings in which Fig. 1 is a side view of my brush; Fig. 2 is a vertical section taken on the line II—II of Fig. 1; Fig. 3 is a top view of the brush; Fig. 4 is a greatly enlarged fragmentary section showing the assembled blocks and plate ready to be put in a furnace for soldering; and Fig. 5 is an end view of a modification in which solder-carrying carbon blocks are about to be joined to a metal plate between them.

Referring to Figs. 1, 2 and 3 of the drawings, a brush is made from a thin metal block or plate 1 sandwiched between two blocks 2 and 3 of carbon in a form that can be baked at high temperature to rid it of impurities. The carbon blocks are soldered to the plate which may be solid copper, copper graphite, copper lead or any suitable material containing metal. A rivet 4 extends through the upper end of the brush. To receive the rivet the two carbon blocks are provided with aligned holes, the outer ends of which are enlarged to form shoulders 6 and 7 and to receive the rivet head and upset end. One of the blocks is also provided with a vertical opening 8 leading down into the enlarged outer end of the underlying hole. The metal plate can be provided with a hole in line with the block holes, or the rivet can be punched through the plate to provide a better electrical connection between the rivet and plate. The head of the rivet clamps against the adjacent shoulder 6 a shunt wire 9 that is looped around the rivet and extends up through the vertical opening, so a good electrical connection is made to the blocks and to the metal plate.

It is a feature of this invention that the carbon blocks and the metal plate are soldered together by a method that includes first applying titanium hydride to one side of each of the blocks. The chemical may be applied as a powder, or, to facilitate handling, the powder may be made into a thin paste by mixing it with water or a volatile solvent, such as glycerin or alcohol. A thin coating 10 of such a paste then may be painted or sprayed on one of the side surfaces of each carbon block, as shown in Fig. 4. Solder 11 then is applied to the titanium hydride coating on the lower block, the metal plate 1 is laid on the solder, more solder is placed on top of the plate, and the coated side of the upper block is laid against the upper layer of solder. The solder may be in the form of a thin ring or disk, a strip, or a wire, but can be a powder if desired. As a powder it may mixed with the titanium hydride and applied with it at the same time. It should be a high melting point solder because it must melt at a temperature in the range in which the titanium hydride decomposes and gives off enough hydrogen to protect itself from oxidation. This range extends from about 500° C. to 1200° C. The solder therefore is generally a silver base solder or a copper base solder, but may even be pure silver or pure copper.

The assembly shown in Fig. 4 (without the rivet and shunt wire) is held together in any suitable manner, such as by a weight on top of it, and then is placed in a furnace which is operated at a high enough temperature to melt the solder and cause it to flow so that it will join together the adjacent surfaces of the carbon blocks and metal plate. Silver solder containing an appreciable amount of copper will melt around 650° C. but it does not flow readily until it reaches approximately 1000° C. This is in the range where titanium hydride gives off a material amount of hydrogen, but is below the melting point of the plate even if it is made of copper.

Also, it is necessary to have a very pure atmosphere in the furnace. This can be accomplished by filling it with hydrogen and keeping the moisture content at a minimum by reducing the dew point, before the hydrogen enters the furnace, to about —60° C. by a suitable drying agent, such as aluminum oxide, after the hydrogen has passed through a palladium catalyst to change all of the hydrogen to water. Some air will be carried into the furnace with the parts being soldered, but the hydrogen will pick it up and form water. The small quantity of water thus formed does not seem to be harmful. Under these conditions of temperature and atmosphere control the solder will melt and spread and firmly adhere to the areas of carbon that have been coated with the titanium hydride, as well as to the metal plate between the carbon blocks.

As the titanium hydride is heated, it dissociates and leaves a residue of pure titanium that unites with the carbon to form a strong bond. The released hydrogen is very beneficial in cleaning the surfaces of the adjoining members so that they can be soldered together easily. Above the temperature at which the bulk of the hydrogen is released the solder melts and flows and readily alloys with the titanium to form with the carbon blocks a chemical bond that is stronger than the blocks themselves. The metal plate is free from oxides because the bonding of the metal to the carbon is done in the absence of oxygen.

In some cases it is advantageous to perform the soldering in a vacuum in the furnace. If the joints are made in a vacuum they are free from occluded gases.

After the soldered unit has been removed from the furnace the shunt wire is riveted in place to complete the brush.

In a modification of this invention, as shown in Fig. 5, the metal plate 1a is not placed in the furnace. Instead, only the carbon blocks 2a and 3a with high melting point solder resting on their titanium hydride covered upper surfaces are heated in the furnace to cause the solder to flow and unite with the carbon. This forms a thin layer 14 of solder on each block, so that after the blocks have been removed from the furnace they can be joined to the metal plate, which then is placed between the two layers of solder, by welding or brazing.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A composite electric brush comprising a pair of carbon blocks joined to the opposite sides of a metal plate by a high melting point solder and titanium hydride, and a shunt wire connected to one end of the blocks and plate.

2. A composite electric brush comprising a pair of carbon blocks, a metal plate between the blocks, titanium hydride soldered bonds joining the blocks to the plate, and a shunt wire connected to one end of the blocks and plate.

3. A composite electric brush comprising a pair of carbon blocks, a metal plate between the blocks, titanium hydride soldered bonds joining the blocks to the plate, one end of the blocks and plate being provided with a hole therethrough, a rivet in said hole, and a shunt wire clamped by the rivet to the adjoining block.

4. A composite electric brush comprising a pair of carbon blocks, a metal plate between the blocks, titanium hydride soldered bonds joining the blocks to the plate, one end of the blocks and plate being provided with aligned holes therethrough, the outer ends of the holes through the blocks being enlarged to form shoulders, a headed rivet extending through said holes, and a shunt wire clamped against one of said shoulders by the adjoining head of the rivet, the opposite end of the rivet being upset over the other of said shoulders.

ERLE I. SHOBERT, II.

REFERENCES CITED

The following references are of record in the file of this patent:

UNITED STATES PATENTS

| Number | Name | Date |
|---|---|---|
| 2,351,798 | Alexander | June 20, 1944 |
| 2,454,579 | Stauffer | Nov. 23, 1948 |

FOREIGN PATENTS

| Number | Country | Date |
|---|---|---|
| 120,842 | Great Britain | Nov. 28, 1918 |
| 28,838 | France | Jan. 8, 1925 |